(12) United States Patent
Chen (10) Patent No.: US 11,029,725 B2
(45) Date of Patent: Jun. 8, 2021

(54) FOLDABLE FOLIO

(71) Applicant: Lenovo (Singapore) Pte. Ltd., Singapore (SG)

(72) Inventor: Chi-Hui Chen, Taipei (TW)

(73) Assignee: Lenovo (Singapore) Pte. Ltd., Singapore (SG)

( * ) Notice: Subject to any disclaimer, the term of this patent is extended or adjusted under 35 U.S.C. 154(b) by 160 days.

(21) Appl. No.: 16/426,879

(22) Filed: May 30, 2019

(65) Prior Publication Data
US 2020/0375329 A1 Dec. 3, 2020

(51) Int. Cl.
*G06F 1/16* (2006.01)
*A45C 11/00* (2006.01)

(52) U.S. Cl.
CPC .......... *G06F 1/1628* (2013.01); *G06F 1/1626* (2013.01); *A45C 11/00* (2013.01); *A45C 2011/002* (2013.01); *A45C 2011/003* (2013.01); *A45C 2200/15* (2013.01)

(58) Field of Classification Search
CPC .............. A45C 11/00; A45C 2011/002; A45C 2011/003; A45C 2200/15; G06F 1/16; G06F 1/1601; G06F 1/1626; G06F 1/1628; H04B 1/3888
USPC ................... 206/320; 361/679.27; 455/575.1
See application file for complete search history.

(56) References Cited

U.S. PATENT DOCUMENTS

| | | | | |
|---|---|---|---|---|
| D658,187 S | * | 4/2012 | Diebel | G06F 1/1679 D14/440 |
| 9,315,004 B2 | * | 4/2016 | Balaji | H04B 1/3888 |
| 9,485,338 B2 | * | 11/2016 | Balaji | H04B 1/3888 |
| 9,651,987 B2 | * | 5/2017 | Yeo | G06F 1/1669 |
| 10,044,395 B2 | * | 8/2018 | Balaji | G06F 1/1626 |
| 10,058,154 B2 | * | 8/2018 | Jo | H04B 1/3888 |
| 10,082,827 B2 | * | 9/2018 | Yamauchi | G06F 1/1681 |
| 2018/0196469 A1 | | 7/2018 | Yamauchi et al. | |

* cited by examiner

*Primary Examiner* — Bryon P Gehman
(74) *Attorney, Agent, or Firm* — Osha Bergman Watanabe & Burton LLP (57) ABSTRACT

A folio for a portable information device may include: a first flat portion attached to a first portion of the portable information device; a second flat portion attached to a second portion of the portable information device; a third flat portion not attached to but in contact with the first portion of the portable information device; a first connecting portion that connects the first flat portion with the second flat portion, wherein the first connecting portion is foldable along a longitudinal axis of the first connecting portion; and a second connecting portion that connects the first flat portion with the third flat portion, wherein the second connecting portion is bendable along a longitudinal axis of the second connecting portion.

15 Claims, 11 Drawing Sheets

FIG. 10

FOLDABLE FOLIO

TECHNICAL FIELD

The present invention relates to a folio, more particularly a foldable folio, for a portable information device.

BACKGROUND

Portable information devices such as tablet PCs and smartphones are widely used. However, to provide good portability, these portable information devices are designed to be relatively compact in size. As a result, they may be easily damaged, e.g., by physical contact with other objects. To prevent damages such as scratches and dents, folios that cover portable information devices are often used. Folios with greater thickness generally provide greater protection.

These portable information devices may have touch panel type displays in place of or in addition to physical keyboards. Self-standing capabilities through foldable chasses and larger screen sizes may be provided for ease of use. As technology advances, portable information devices have been proposed with not only foldable chasses but also foldable displays, for example, organic EL (Electro Luminescence) displays as described in JP 2014-216025 A.

SUMMARY

According to one or more embodiments, a folio for a portable information device includes: a first flat portion attached to a first portion of the portable information device; a second flat portion attached to a second portion of the portable information device; a third flat portion not attached to but in contact with the first portion of the portable information device; a first connecting portion that connects the first flat portion with the second flat portion, wherein the first connecting portion is foldable along a longitudinal axis of the first connecting portion; and a second connecting portion that connects the first flat portion with the third flat portion, wherein the second connecting portion is bendable along a longitudinal axis of the second connecting portion.

According to one or more embodiments, the second flat portion attaches to the portable information device via a slider, and the slider allows the second flat portion to slide relative to a surface of the second portion of the portable information device in a direction perpendicular to a folding axis of the portable information device.

According to one or more embodiments, one edge of the third flat portion supports the portable information device on a flat surface when the second connecting portion is bent along the longitudinal axis of the second connecting portion.

According to one or more embodiments, the folio further includes: a hinge that connects the first flat portion with the third flat portion.

According to one or more embodiments, a first end of the hinge is fastened to the first flat portion and a second end of the hinge is slidably attached to the third flat portion.

According to one or more embodiments, the second end of the hinge allows the third flat portion to slide relative to a movement of the hinge.

According to one or more embodiments, a first end of the hinge is fastened to the third flat portion and a second end of the hinge is slidably attached to the first flat portion.

According to one or more embodiments, the second end of the hinge allows the first flat portion to slide relative to a movement of the hinge.

According to one or more embodiments, a second side of the folio opposite to a first side of the folio that attaches to the portable information device is bare and forms a flat surface when the folio is extended (i.e., is neither bent nor folded).

According to one or more embodiments, a folio for a portable information device includes: a first flat portion attached to a first portion of the portable information device; a second flat portion attached to a second portion of the portable information device; and a connecting portion that connects the first flat portion with the second flat portion, wherein the connecting portion is foldable along a longitudinal axis of the connecting portion, the second flat portion attaches to the portable information device via a slider, and the slider allows the second flat portion to slide relative to a surface of the second portion of the portable information device in a direction perpendicular to a folding axis of the portable information device.

According to one or more embodiments, a second side of the folio opposite to a first side of the folio that attaches to the portable information device is bare and forms a flat surface when the folio is extended (i.e., is neither bent nor folded).

According to one or more embodiments, a folio for a portable information device includes: a first flat portion attached to the portable information device; a second flat portion not attached to but in contact with the portable information device; and a connecting portion that connects the first flat portion with the second flat portion, wherein the connecting portion is bendable along a longitudinal axis of the connecting portion.

According to one or more embodiments, one edge of the second flat portion supports the portable information device on a flat surface when the connecting portion is bent along the longitudinal axis of the connecting portion.

According to one or more embodiments, the folio further includes: a hinge that connects the first flat portion with the second flat portion.

According to one or more embodiments, a first end of the hinge is fastened to the first flat portion and a second end of the hinge is slidably attached to the second flat portion.

According to one or more embodiments, the second end of the hinge allows the second flat portion to slide relative to a movement of the hinge.

According to one or more embodiments, a first end of the hinge is fastened to the second flat portion and a second end of the hinge is slidably attached to the first flat portion.

According to one or more embodiments, the second end of the hinge allows the first flat portion to slide relative to a movement of the hinge.

According to one or more embodiments, a second side of the folio opposite to a first side of the folio that attaches to the portable information device is bare and forms a flat surface when the folio is extended (i.e., is neither bent nor folded).

DETAILED DESCRIPTION

Figure 1:
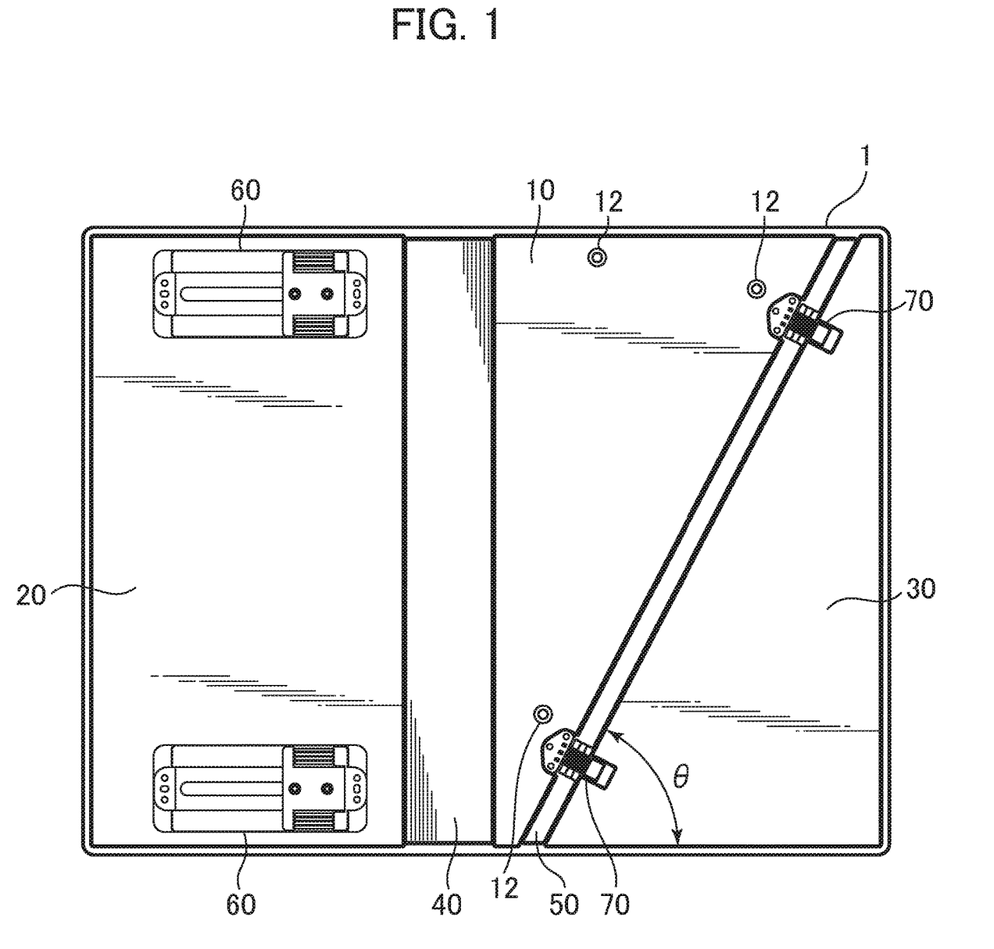
FIG. 1 shows a schematic view of a first side of a foldable folio according to one or more embodiments.

FIG. 1 shows a schematic view of a foldable folio 1 according to one or more embodiments seen from a side that is attached to a portable information device 100 (not shown in FIG. 1). The foldable folio 1 comprises a first flat portion 10, a second flat portion 20, a third flat portion 30, a first connecting portion 40 that connects the first flat portion 10 with the second flat portion 20, and a second connecting portion 50 that connects the first flat portion 10 with the third flat portion 30.

FIG. 1 shows that the foldable folio 1 may have a rectangular profile when all of the portions 10, 20, 30, 40, 50 are laid flat. However, the foldable folio 1 is not limited to any particular shape.

In the example shown, the first flat portion 10 and the third flat portion 30 may have trapezoidal shapes and may form, together with the second connecting portion 50, a rectangular (or substantially rectangular) profile when laid flat. The first flat portion 10 and the third flat portion 30 may be nearly identical in shape and size. The second flat portion 20 may have a rectangular shape by itself.

A longitudinal axis of the first connecting portion 40 (i.e., an axis that runs along a lengthwise direction of the first connecting portion 40) is parallel to a longitudinal axis of the second flat portion 20 (i.e., an axis that runs along a lengthwise direction of the second flat portion 20).

As also shown in FIG. 1, the second connecting portion 50 may have a longitudinal axis that forms an angle θ, which is greater than 0 degrees but less than 90 degrees, with one of the sides of the rectangular (or substantially rectangular) profile of the foldable folio. Alternatively, the angle θ may be greater than or equal to 45 degrees and less than 75 degrees, or may be 60 degrees.

The first flat portion 10, the second flat portion 20, and the third flat portion 30 remain flat at all times during use of the foldable folio 1. On the other hand, a first connecting portion 40 and the second connecting portion 50 may deform to bend along their longitudinal axes. To facilitate deformation of the first and/or second connecting portions 40, 50, a thickness of the first and/or second connecting portions 40, 50 may be made thinner compared to a thickness of any one of the flat portions 10, 30, 40. To further facilitate the deformation, the first and/or second connecting portions 40, 50 may also include grooves that extend in a direction parallel with the axes of bending.

Referring still to FIG. 1, the first flat portion 10 may be directly attached and secured to a first part of the portable information device 100. The first flat portion 10 can be fixed to the first part of the portable information device through insertion of pins on the portable information device 100 into recesses 12 on a surface of the first flat portion 10. Although there are three recesses 12 shown in FIG. 1, a different number of recesses 12 may be used to attach and secure the foldable folio 1 to the portable information device 100. In one or more embodiments, some or all of the recesses 12 may be threaded for insertion of screws instead of pins.

Figure 3A:
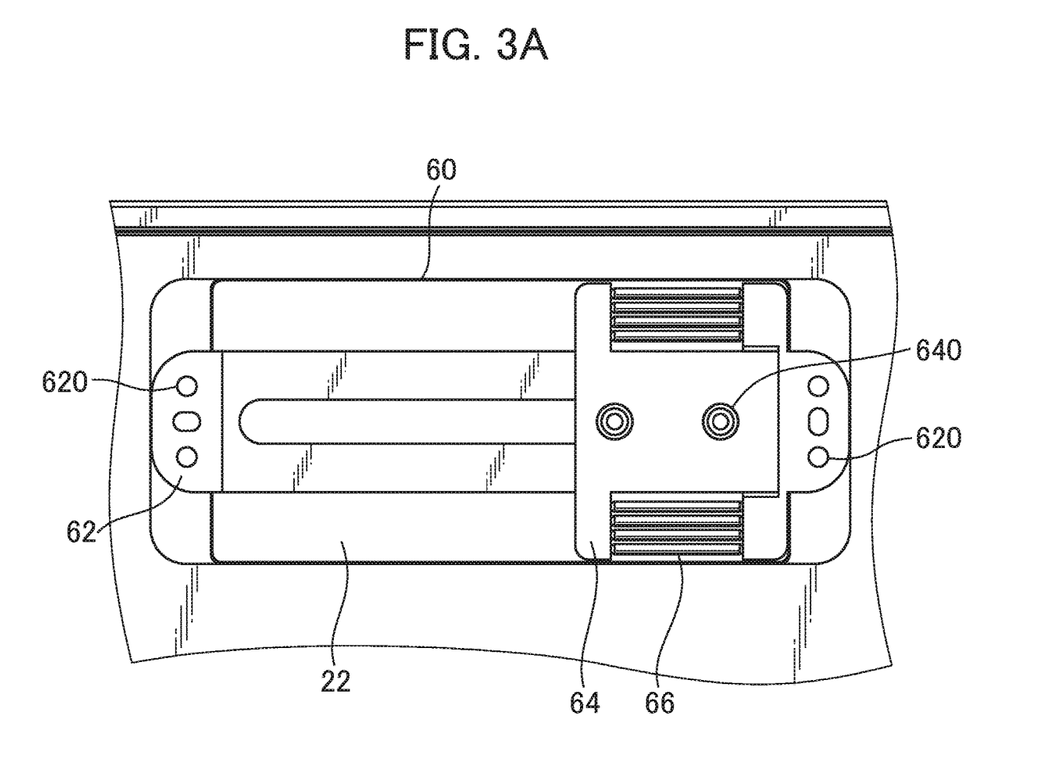
FIG. 3A shows a close-up view of a slider according to one or more embodiments.

Further, the second flat portion 20 may be attached and secured to a second part of the portable information device 100 via attachments 60. The second flat portion 20 includes two attachments 60, which are described in more detail below with reference to FIG. 3.

Further still, the third flat portion 30, unlike the flat portion 10 and the flat portion 20, need not be attached to the portable information device 100. The third flat portion 30 may be connected to the first flat portion 10 via the second connecting portion 50 and one or more hinge structures 70, which are described in more detail below with reference to FIG. 5.

Figure 2:
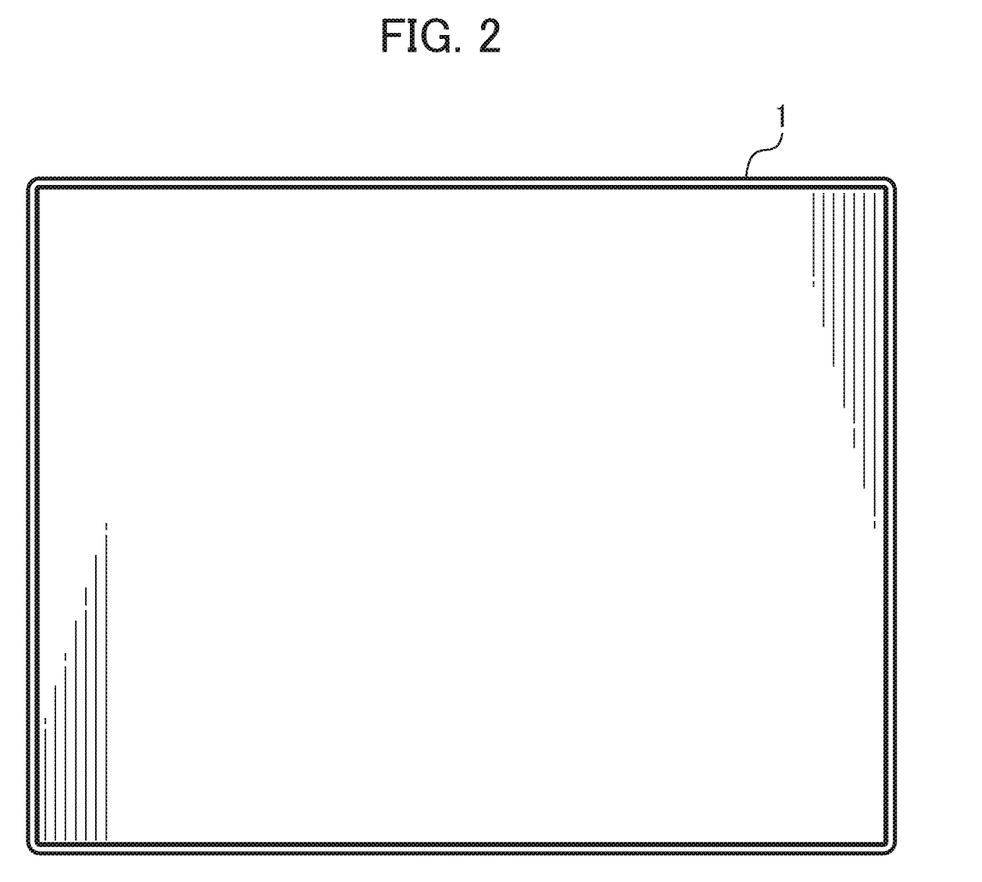
FIG. 2 shows a schematic view of a second side, opposite the first side shown in FIG. 1, of the foldable folio according to one or more embodiments.

FIG. 2 shows a schematic view of the foldable folio 1 as seen from the opposite side of the side shown in FIG. 1. This side of the foldable folio 1 may be completely or nearly completely flat without any components disposed on the surface.

Figure 3B:
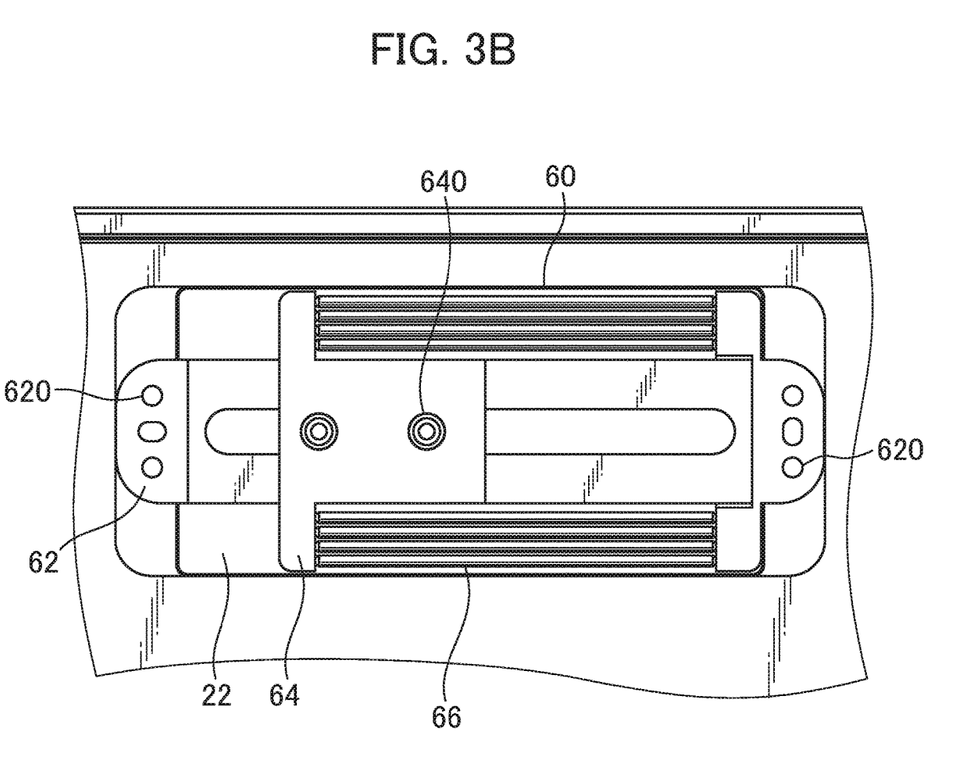
FIG. 3B shows a close-up view of the slider shown in FIG. 3A in a different position.
Figure 4:
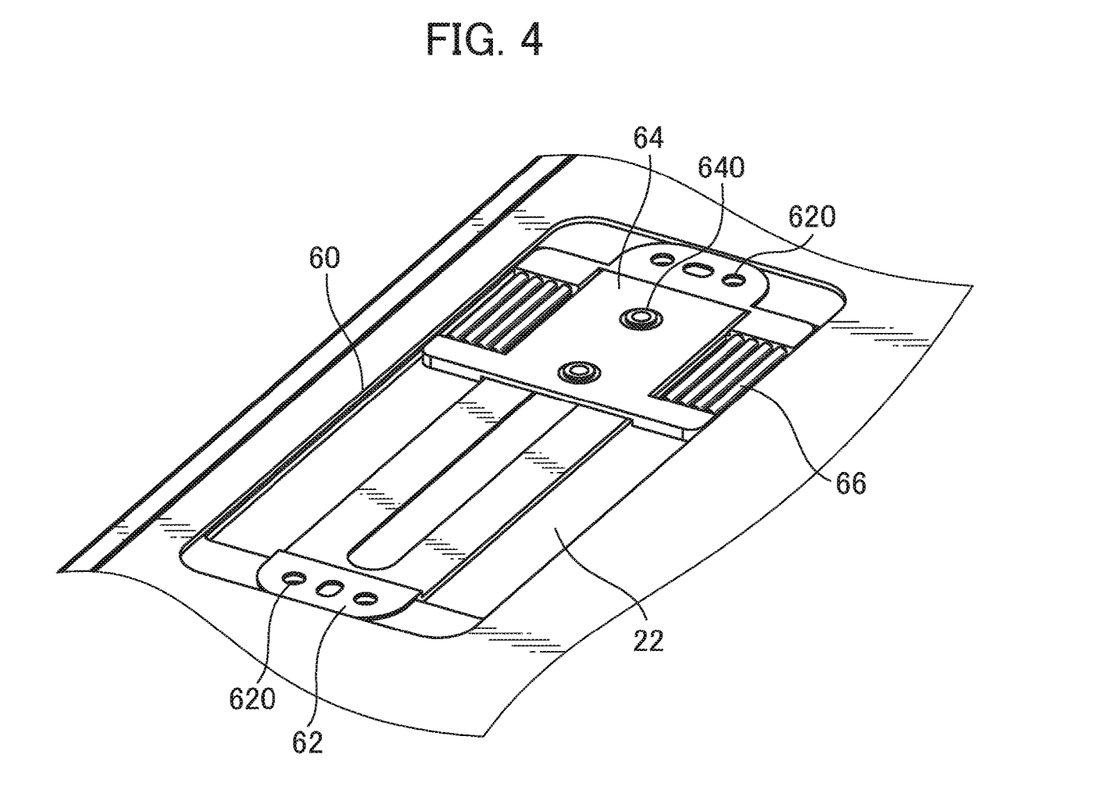
FIG. 4 shows a perspective view of the slider shown in FIG. 3.

FIGS. 3A, 3B, and 4 show close-up views of the attachment 60 according to one or more embodiments. The attachment 60 may comprise an attachment body 62 and a slider 64. The entire setup of the attachment 60 may be disposed in a recess 22 provided in the second flat portion 20. The attachment body 62 may be fixed to the second flat portion 20 of the foldable folio 1 via apertures 620 arranged at multiple locations on the attachment body 62.

The slider 64 may be attached to the portable information device 100 via recesses or through-holes 640. The slider 64 may be disposed so that it can slide along a longitudinal direction of the attachment body 62 of the attachment 60. For example, as seen in FIG. 3B, the slider 64 is moved to a position along the attachment body 62 that is different from that shown in FIG. 3A. Further, the slider 64 may be connected to the attachment body 62 using one or more springs 66. As seen in FIG. 1, the attachments 60 may be aligned in the same direction as one another so that all of the sliders 64 are disposed in a direction perpendicular to the longitudinal axis of the first connection porting 40.

Figure 5:
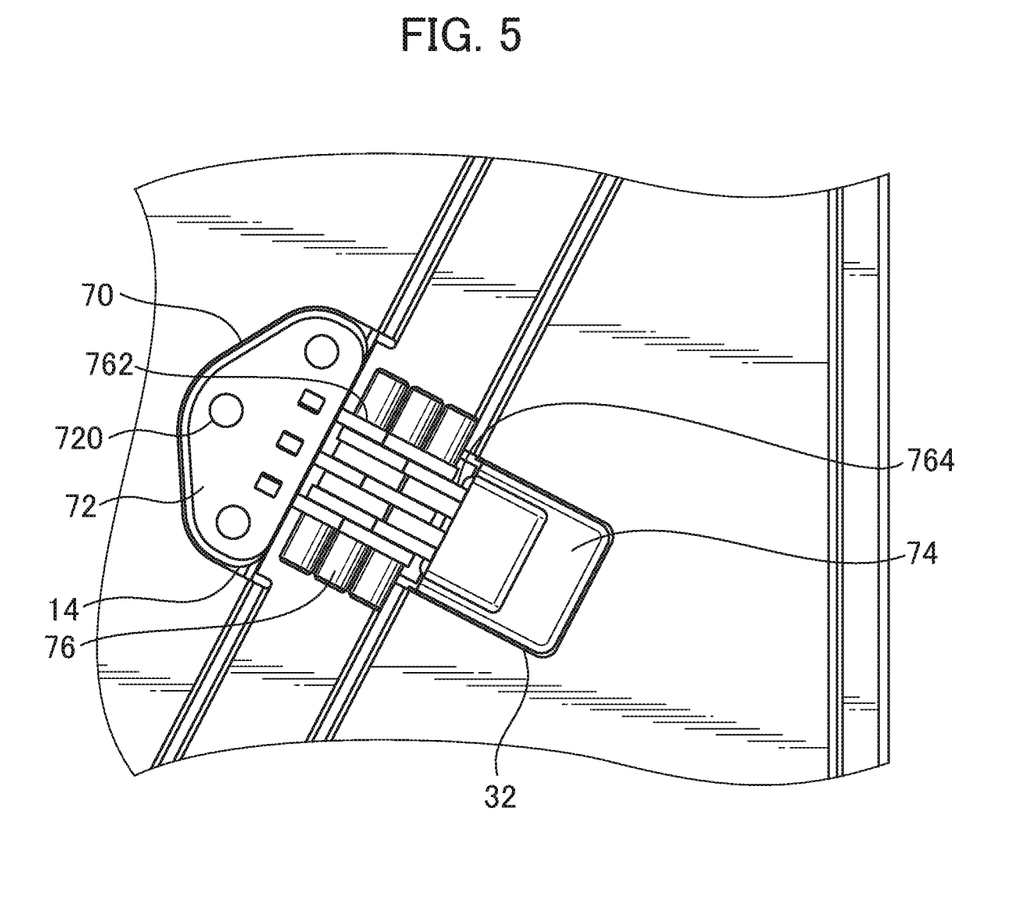
FIG. 5 shows a close-up view of a hinge according to one or more embodiments.
Figure 6:
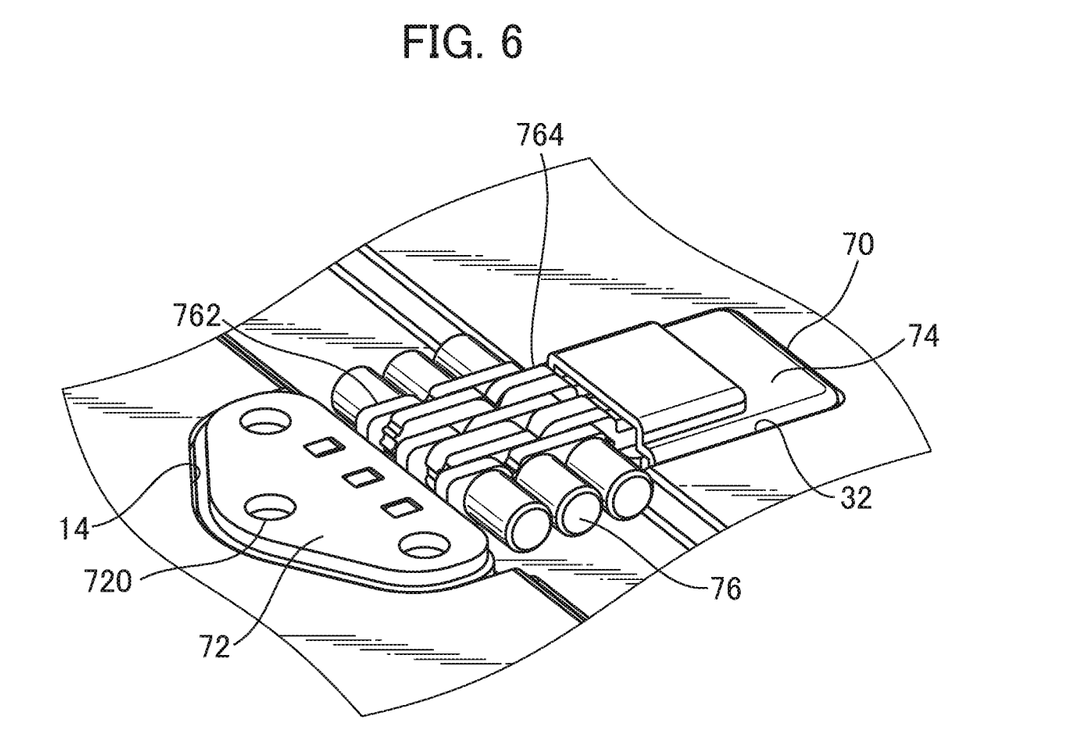
FIG. 6 shows a perspective view of the hinge shown in FIG. 5.

FIGS. 5 and 6 show close-up views of the hinge structure 70 according to one or more embodiments. As seen in FIGS. 5 and 6, the hinge structure 70 may be formed in a multi-linkage configuration comprising a plurality of integrated linkage plates 762, 764 and axis pieces 76.

As seen more clearly in the perspective view of the hinge structure 70 of FIG. 6, a first end 72 of the hinge structure 70 is placed in a recess 14 on a surface of the first flat portion 10. The first end 72 may be fixed to the first flat portion 10 using one or more through holes 720. The inner surface of the through holes 720 may be flat or threaded. Secure attachment of the first end 72 to the first flat portion 10 may be achieved using, for example, pins (not shown) or screws (not shown) inserted into the through holes 720.

Further, the hinge structure 70 may comprise linkage plates 762 disposed adjacent to and tightly fixed to the first end 72. The linkage plates 762 may be clamped between the first end 72 the surface of the first flat portion 10. Alternatively, the linkage plates 762 may be adhered or welded to the first end 72.

Further still, the hinge structure 70 may further comprise a second end 74 placed in a recess 32 on a surface of the third flat portion 30. The second end 74 may be fixed to the third flat portion 30 using adhesive. Alternatively, other methods of fixing the second end 74 to the third flat portion 30 such as securing the second end 74 using pins and/or screws may be applied.

Still referring to FIGS. 5 and 6, the linkage plates 764 adjacent to the second end 74 need not be physically fixed to the second end 74 and instead may slide in or out of a space arranged between the second end 74 and the surface of the third flat portion 30. Alternatively, the space may be formed entirely by the second end 74 in the form of a cavity in a body of the second end 74 that envelopes the linkage plates 764 adjacent to the second end 74. The linkage plates 762 and the linkage plates 764 may be connected indirectly via the connection of other linkage plates and the axis pieces 76.

According to one or more embodiments, the hinge structure 70 not only allows the second connecting portion 50 to be bent along an axis parallel with the longitudinal axis of the second connecting portion 50 but also allows the second connecting portion 50 to hold a bending position through friction resulting from rotating the plurality of axis pieces 76 and/or from slinging of the linkage plates 764 in the second end 74. Although the hinge structure 70 was described above as multi-linkage hinge structure, conventional single-axis hinges may also be used instead of the multi-linkage hinge structure.

Figure 7:
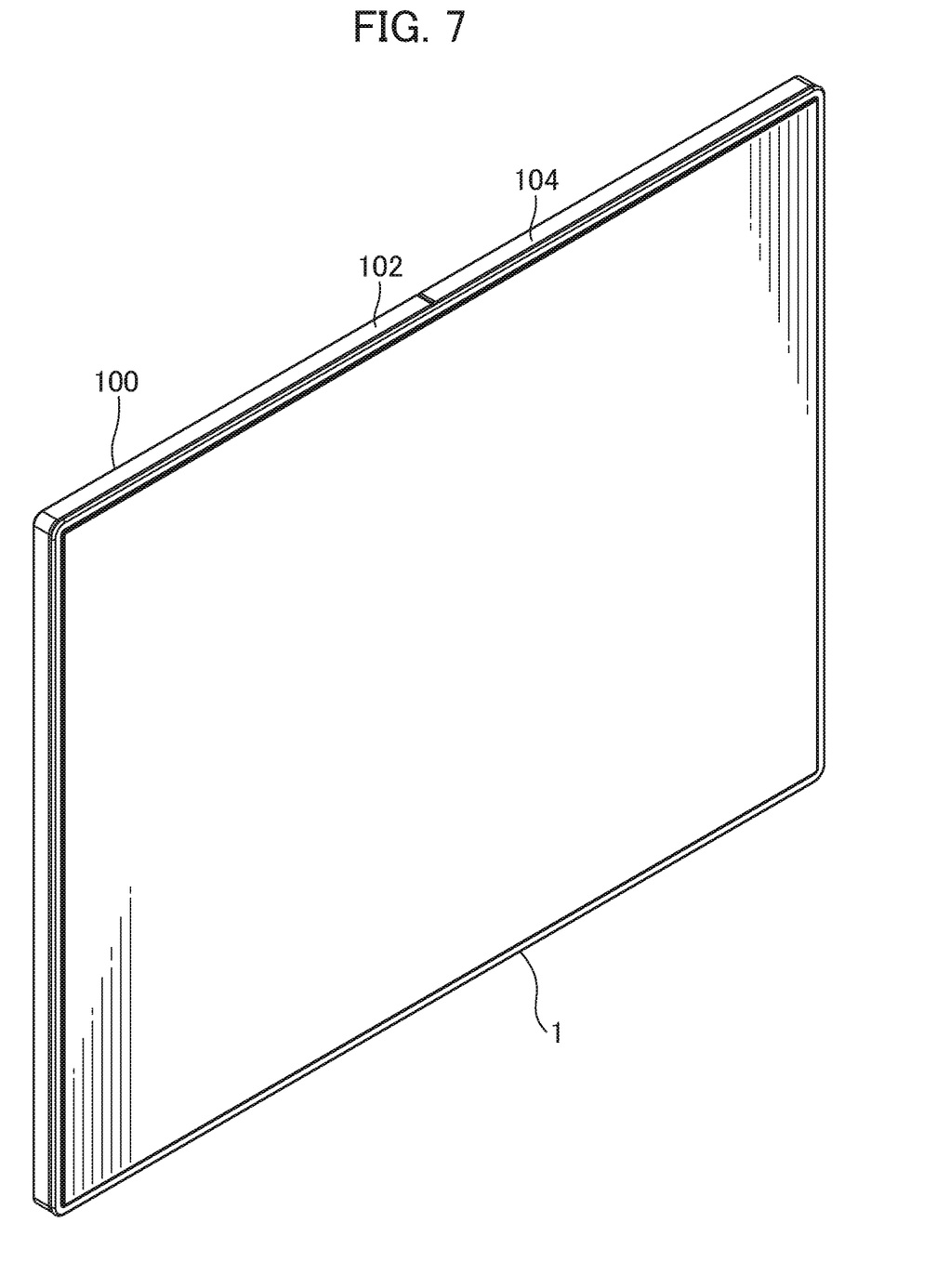
FIG. 7 shows a perspective view of a portable information device with the foldable folio according to one or more embodiments in an open position.

In accordance with one or more embodiments, FIG. 7 shows a perspective view of the foldable folio 1 when it is attached to the portable information device 100. The portable information device 100 may comprise two portions 102, 104. The first flat portion 10 of the foldable folio 1 is attached to the first portion 102 and the second flat portion 20 is attached to the second portion 104.

Still referring to FIG. 7, when the foldable folio 1 is opened and laid flat, the entirety of a display surface (not shown) of the portable information device 100 may be accessible. Furthermore, the side of the foldable folio is fully extended and may provide a flat surface that can be used to hold the portable information device in the palm of a user or place the portable information device on a surface of a table.

As seen in FIG. 7, the size of the foldable folio 1 when laid flat may match the size of the portable information device 100 such that the folio 1 provides exact coverage of a backside of the portable information device 100.

Figure 8:
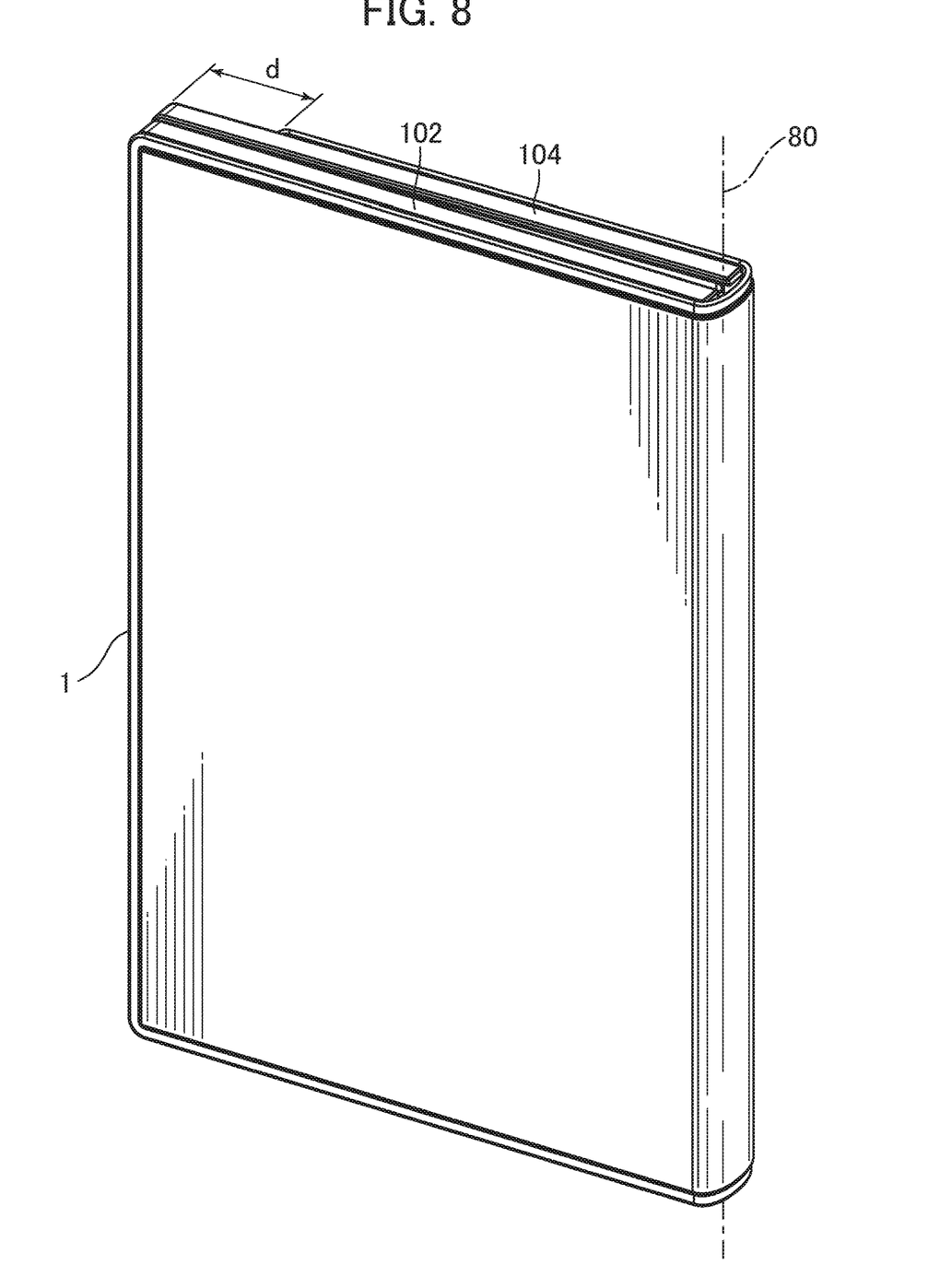
FIG. 8 shows a perspective view of a portable information device with the foldable folio according to one or more embodiments in a folded position.

FIG. 8 shows a perspective view of the foldable folio 1 and the portable information device 100 in a folded position according to one or more embodiments. In this example, the portable information device 100 is folded in half along the axis of folding 80 and respective faces of the two portions 102, 104 come close with each other. In the folded position, the first flat portion 10 (attached to the portion 102) and the second flat portion 20 (attached to the second portion 104) remain flat. On the other hand, the first connecting portion 40 is deformed to maintain the integrity of the foldable folio 1 in the folded position.

Referring to FIG. 8, in the folded position, the first portion 102 and the second portion 104 of the portable information device 100 are pivoted with respect to each other around an axis of folding. The foldable folio 1, more specifically the first connecting portion 40 of the foldable folio 1, may be further away from the axis of folding 80 by some distance, e.g., a distance equivalent to the curvature radius of bending of the first connecting portion 40, than the first and second portions 102, 104 of the portable information device 100. Furthermore, in the folded position of FIG. 8, a circumferential length around the axis of folding 80 becomes longer along the foldable folio 1 than along the portable information device 1 by a distance d, which may be associated with the curvature radius of bending of the first connection portion 40.

Figure 9A:
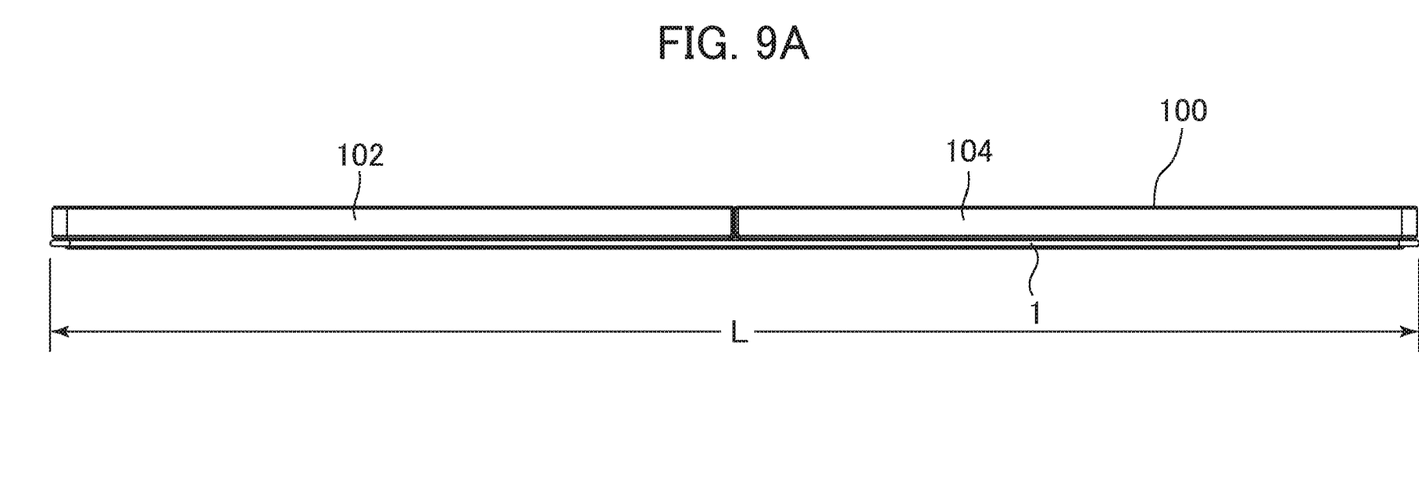
FIG. 9A shows a plan view of a portable information device with the foldable folio in an open position according to one or more embodiments.
Figure 9B:
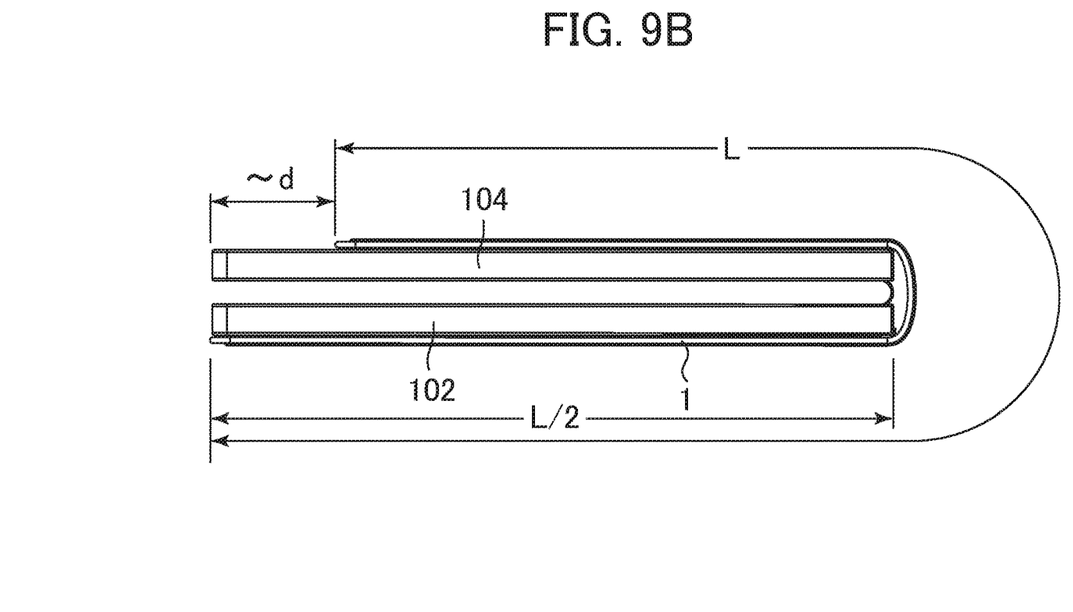
FIG. 9B shows a plan view of a portable information device with the foldable folio in a folded position according to one or more embodiments.

FIG. 9A shows a plan view of a portable information device 100 with the foldable folio 1 in an open position according to one or more embodiments. Referring to FIG. 9A, the first and second portions 102, 104 of the portable information device 100 has a total length of L when the information device 100 is in a fully-opened position. The foldable folio 1 also has a same length L to provide exact coverage for a backside of the portable information device 100. Referring to FIG. 9B, the potable information device 100 attached with the foldable folio 1 is folded in half. While folded in half, the first and second portions 102, 104 of the portable information device 100 has a length of L/2 and are disposed approximately in parallel to one another. The foldable folio 1 warps around the first and second portions 102, 104 of the portable information device 100. Because the length of the foldable folio 1 remains as L, the foldable folio may become too short by about the distance d.

Although not shown, the first flat portion 10 of the foldable folio 1 is attached to and secured to the first portion 102 of the portable information device 100, and therefore the second flat portion 20 of the foldable folio 1 may slide relative to the second portion 104 of the portable information device 100 to accommodate the distance d. This may be achieved through movements of the slider 64 of the attachment 60. For example, the slider 64 slides within the attachment 60 in response a change in the distance d.

The springs 66 of the attachment 60 may be designed to provide a tension force between the attachment body 62 and the slider 64 when the foldable folio 1 is opened to hold the foldable folio 1 and the portable information device 100 in a flat position. Alternatively, different mechanisms that can maintain a flat shape between the foldable folio 1 and the portable information device 100, such as a latch, may be used instead of the springs 66 in the attachment 60.

Figure 10:
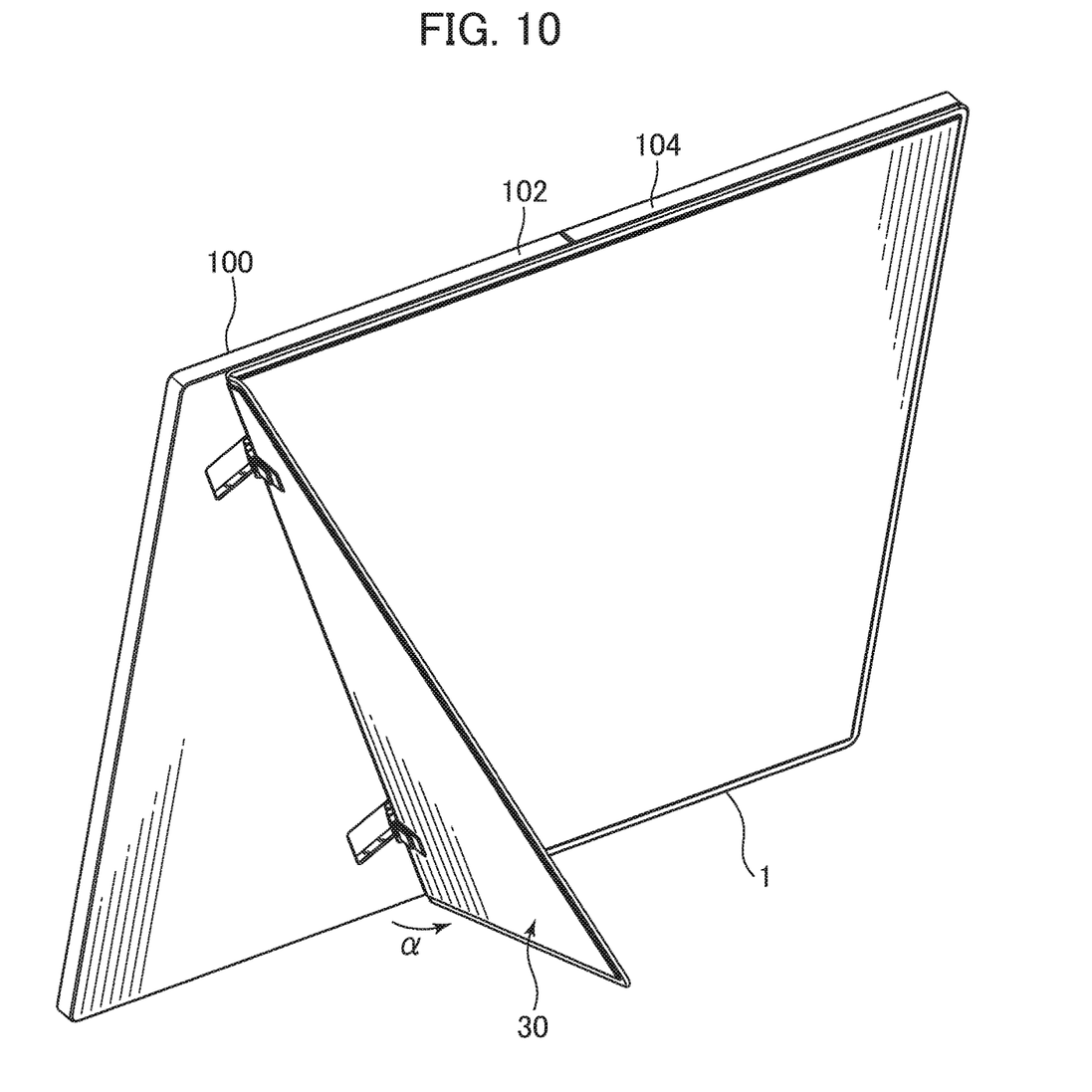
FIG. 10 shows a perspective view of a portable information device with the foldable folio according to one or more embodiments in an open position and when one flat portion of the foldable folio is deployed.

In accordance with one or more embodiments, FIG. 10 shows a perspective view of a portable information device 100 with the foldable folio 1 in an open position and when one flat portion (i.e., the flat portion 30) of the foldable folio 1 is deployed. An angle α is formed with respect to the surface of the portable information device 100 that contacts the flat portion 30 when the third flat portion 30 is deployed. The angle α may be less than or equal to 90 degrees. Because the angle θ discussed with reference to FIG. 1 is less than 90 degrees, when the assembly shown in FIG. 9 is placed on a flat surface such as a table top, the portable information device 100 may tilt at an angle determined by the combination of the angles θ and a. This way, the display of the portable information device 100 may be directed towards a gaze of the use and easily viewed by the user.

Although FIG. 10 shows the portable information device 100 placed in a landscape orientation in FIG. 10, the portable information device 100 may also be placed in a portrait orientation and supported by the deployed flat portion 30.

Although the disclosure has been described with respect to a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A folio for a portable information device, the folio comprising:
   a first flat portion attached to a first portion of the portable information device;
   a second flat portion attached to a second portion of the portable information device;
   a third flat portion not attached to but in contact with the first portion of the portable information device;
   a first connecting portion that connects the first flat portion with the second flat portion, wherein the first connecting portion is foldable along a longitudinal axis of the first connecting portion; and
   a second connecting portion that connects the first flat portion with the third flat portion, wherein the second connecting portion is bendable along a longitudinal axis of the second connecting portion.

2. The folio of claim 1, wherein
   the second flat portion attaches to the portable information device via a slider, and
   the slider allows the second flat portion to slide relative to a surface of the second portion of the portable information device in a direction perpendicular to the longitudinal axis of the first connecting portion.

3. The folio of claim 1, wherein one edge of the third flat portion supports the portable information device on a flat surface when the second connecting portion is bent along the longitudinal axis of the second connecting portion.

4. The folio of claim 1, further comprising a hinge that connects the first flat portion with the third flat portion.

5. The folio of claim 4, wherein a first end of the hinge is fastened to the first flat portion and a second end of the hinge is slidably attached to the third flat portion.

6. The folio of claim 5, wherein the second end of the hinge allows the third flat portion to slide relative to a movement of the hinge.

7. The folio of claim 4, wherein a first end of the hinge is fastened to the third flat portion and a second end of the hinge is slidably attached to the first flat portion.

8. The folio of claim 7, wherein the second end of the hinge allows the first flat portion to slide relative to a movement of the hinge.

9. The folio of claim 1, wherein a second side of the folio opposite to a first side of the folio that attaches to the portable information device is bare and forms a flat surface when the first connecting portion is not folded and the second connecting portion is not bent.

10. A folio for a portable information device, the folio comprising:
    a first flat portion attached to the portable information device;
    a second flat portion not attached to but in contact with the portable information device;
    a connecting portion that connects the first flat portion with the second flat portion; and
    a hinge that connects the first flat portion with the second flat portion, wherein
    the connecting portion is bendable along a longitudinal axis of the connecting portion,
    a first end of the hinge is fastened to the first flat portion, and
    a second end of the hinge is slidably attached to the second flat portion.

11. The folio of claim 10, wherein one edge of the second flat portion supports the portable information device on a flat surface when the connecting portion is bent along the longitudinal axis of the connecting portion.

12. The folio of claim 10, wherein the second end of the hinge allows the second flat portion to slide relative to a movement of the hinge.

13. The folio of claim 12, wherein a first end of the hinge is fastened to the second flat portion and a second end of the hinge is slidably attached to the first flat portion.

14. The folio of claim 13, wherein the second end of the hinge allows the first flat portion to slide relative to a movement of the hinge.

15. The folio of claim 10, wherein a second side of the folio opposite to a first side of the folio that attaches to the portable information device is bare and forms a flat surface when the connecting portion is not bent.

* * * * *